(12) United States Patent
Hien et al.

(10) Patent No.: US 10,564,259 B2
(45) Date of Patent: Feb. 18, 2020

(54) METHOD AND SYSTEM FOR DETECTING, CHARACTERIZING AND ASSESSING THE QUALITY OF A SPRAY

(71) Applicant: MSO Meßtechnik und Ortung GmbH, Bad Münstereifel (DE)

(72) Inventors: Peter Hien, Bad Münstereifel (DE); Thorsten Krauland, Bad Münstereifel (DE)

(73) Assignee: MSO Messtechnik und Ortung GmbH, Bad Münstereifel (DE)

( * ) Notice: Subject to any disclaimer, the term of this patent is extended or adjusted under 35 U.S.C. 154(b) by 145 days.

(21) Appl. No.: 15/712,188

(22) Filed: Sep. 22, 2017

(65) Prior Publication Data

US 2019/0049559 A1 Feb. 14, 2019

(30) Foreign Application Priority Data

Aug. 10, 2017 (EP) ..................... 17185736

(51) Int. Cl.
| | |
|---|---|
| *G01S 7/41* | (2006.01) |
| *B05B 12/00* | (2018.01) |
| *G01S 13/88* | (2006.01) |
| *G01S 13/58* | (2006.01) |
| *B05B 1/14* | (2006.01) |
| *G01S 7/35* | (2006.01) |

(52) U.S. Cl.
CPC ................ *G01S 7/412* (2013.01); *B05B 1/14* (2013.01); *B05B 12/004* (2013.01); *B05B 12/008* (2013.01); *G01S 7/352* (2013.01); *G01S 7/417* (2013.01); *G01S 13/583* (2013.01); *G01S 13/88* (2013.01); *G01S 2007/356* (2013.01)

(58) Field of Classification Search
CPC ... B05B 12/004; B05B 12/006; B05B 12/008; G01S 7/412; G01S 2007/356; G01S 13/583; G01S 13/88
See application file for complete search history.

(56) References Cited

U.S. PATENT DOCUMENTS 2,824,284 A * 2/1958 Johnson ................... G01P 3/665
324/642
4,467,961 A * 8/1984 Coffee ................. A01M 7/0089
239/1

(Continued)

FOREIGN PATENT DOCUMENTS

EP 2756745 A1 * 7/2014 ........... A01C 17/001

*Primary Examiner* — Ryan A Reis
(74) *Attorney, Agent, or Firm* — Smartpat PLC

(57) ABSTRACT

The present disclosure relates to a method for the detection, characterization and assessment of the quality of a spray which is produced by atomizing liquids with nozzles of different designs and constructional forms. The spray may have an application-specific droplet size distribution ranging from fine to very coarse droplets which move at different speeds. A radar signal is directed into and reflected by the spray. The reflected radar signal is subject to a Doppler shift caused by the movement of the droplets in the spray. The transmitted and received radar signals are mixed to create a low-frequency Doppler oscillation signal which is sampled at a predetermined rate with an analog-digital converter, the output of which is stored in a data array and transformed from the time domain into the frequency domain for further processing.

12 Claims, 3 Drawing Sheets

(56) References Cited

U.S. PATENT DOCUMENTS

| | | | |
|---|---|---|---|
| 5,315,306 A * | 5/1994 | Doughty | B05B 12/082 342/104 |
| 6,298,719 B1 | 10/2001 | Schoeffel et al. | |
| 8,134,703 B2 | 3/2012 | Sivathanu et al. | |
| 2003/0052811 A1 * | 3/2003 | Lawless | G01S 7/35 342/28 |
| 2013/0192385 A1 | 8/2013 | Lee et al. | |

* cited by examiner

METHOD AND SYSTEM FOR DETECTING, CHARACTERIZING AND ASSESSING THE QUALITY OF A SPRAY

TECHNICAL FIELD

The present disclosure relates to a method for detecting, characterizing and assessing the quality of a spray. The spray may be produced by atomizing liquids with nozzles of different designs and constructional forms and may have an application-specific droplet size which can vary from fine to very coarse droplets. The method may use a continuous-wave (CW) radar sensor which emits a radar signal directed at the spray and which receives a radar signal reflected from the moving spray with a shifted frequency due to the Doppler effect.

The disclosure further relates to system for monitoring the working quality of spraying systems having a plurality of nozzles by evaluating the deviation of a detected radar signature from a reference signature.

BACKGROUND

In a variety of processes, liquids with dissolved, emulsified or dispersed components or powders are atomized with nozzles of different designs and constructional forms to produce a spray. In the following, mainly sprayed liquids are considered.

A pressurized liquid is fed into nozzles to produce a spray with an application-specific droplet size distribution which may vary from fine to very coarse droplets which move at different speeds. In the spray, coarse drops have higher velocities than small droplets. The spray resulting from the atomization is to be applied to a target according to a desired distribution, which is usually uniform. The spray should correspond to a certain pattern and specifications with regard to its quality parameters. Quality here is to be understood as "degree in which a set of inherent features of an object meets requirements" according to the standard DIN EN ISO 9000: 2015-11. The features here referred to as quality of the spray are its quality parameters.

The quality parameters of a spray are its spray angle, the amount of its volumetric flow, its spatial volumetric flow distribution, its droplet or particle size distribution and the related drift, the velocity distribution of the droplets or particles, and the impulsive force of the droplets as well as their distribution when they meet the target. The working quality of a nozzle can deteriorate during operation by intrinsic factors influencing the atomization such as wear, caking and clogging of different degrees up to complete blockage. The quality of the spray can also be negatively affected by a variety of external factors, such as incorrectly adjusted delivery pressure of the material to be atomized or the carrier air, pressure fluctuations, clogged filters, clogged or partially blocked dozing apertures upstream of the nozzles, incorrect nozzle selection not suitable for application, incorrect cleaning of the nozzles, wind speed, movement (pitch, yaw) of the boom of the spraying system, and turbulence due to high driving speed.

Until now, a continuous non-contact detection of the quality parameters and the distribution pattern of the spray required a very complicated process or was impossible. This applies both to atomization by an individual nozzle and to complex systems with a plurality of nozzles, such as, for example, plant protection devices. The quality assurance of spraying processes has hitherto been possible with high effort only on a sample-by-sample basis from time to time. Continuous monitoring and maintaining quality of spraying processes in real-time is not possible or is only possible at extremely high cost. This is highly relevant to the efficiency and precision of industrial and agricultural spraying processes.

Various solutions have been proposed for assessing quality parameters of single nozzle sprayers and of spraying systems with a plurality of nozzles. Assessing different quality parameters of a spray is required during the development of novel nozzles, the adaptation of existing nozzles, the testing and approval of new spray systems, and the testing of spraying systems which are already in use, for example crop protection equipment. The measuring means according to the prior art measure individual or a few quality parameters of the spray.

For the detection and characterization of the angular distribution of a spray, various so-called patternators are constructed which are linear, circular, or sector-shaped. The spray is divided. The separated volume streams are collected in a plurality of containers and their volume or mass is determined. Exemplary such systems are disclosed in U.S. Pat. No. 6,298,719 titled "Measuring the angular distribution of a liquid spray produced by a fuel injection valve" and US patent application publication 2013/0192385 titled "Device for measuring droplet mass flux distributions to test spray injection system and the measuring method". U.S. Pat. No. 6,298,719 and US 2013/0192385 are hereby incorporated by reference thereto in their entireties. The inertial fractional separation of the droplet sizes of the spray is possible with a cascade impactor, for example Model 20-800 Ambient Cascade Impactor from TISCH Environmental Inc.

Visible impressions or spots are caused by droplets impinging plates coated with, for example, gelatin or magnesium oxide or water or oil-sensitive paper with color change through the liquid (for example Kromekote card). These are then measured manually or semi-automatically, for example by scanning with a commercially available flatbed scanner and evaluation of the droplet sizes and distribution by special software such as DropletScan from Devore Systems Inc.

The angular distribution of a spray can also be detected by means of mechanical methods of the spatially resolved impulse measurement (for example, Tactilus from SPI Sensor Products Inc.). In this case, the force of the impinging droplets is measured in a spatially resolved manner by means of a two-dimensional sensor array.

In accordance with the German Ordinance on the Testing of Plant Protection Devices (Plant Protection Equipment Ordinance of 27 Jun. 2013 (Federal Law Gazette I, 1953, 1962)) of the Federal Ministry of Food, Agriculture and Consumer Protection and SPISE (Standardized Procedure for the Inspection of Sprayers in Europe) in the context of EU directive 2009/128/EC, the testing of plant protection products is carried out on a regular basis by means of cross-distribution testers. These have a series of channels arranged at a right angle to the spray fan. The volume flow is collected and the volume is measured. The degree of deviation of the distribution over the working width of the plant protection device is usually expressed as a variation coefficient. Cross-distribution testers are, for example, the horizontal patternator and spray scanner made by ARMS Salvarani BVBA.

Optical measuring systems are used within the scope of DIN SPEC 91342 "Characterization of atomized fluids—Determination of the relative volume flux density distribution in sprays". ASTM International (originally American Society for Testing and Materials) Standard E799-03 "Standard Practice for Determination of Data Criteria and Processing for Liquid Drop Size Analysis" does not define any measurement procedures, but procedures for calculating the droplet size distribution. EPA (United States Environmental Protection Agency) guideline OPPTS 840.1100 "Spray Droplet Size Spectrum" for the determination of the droplet size distribution does not define a particular measuring method.

By means of a scanning Laser Doppler Velocimetry (LDV) method, the velocity of the droplets and the distribution of the velocity of the droplets in the spray can be determined.

A Phase Doppler Particle Analyzer (PDPA), for example those made by Dantec Dynamics A/S or TSI Incorporated, combines the measurement of droplet size and -speed. A spatial resolution can be achieved by scanning.

The volume flow density distribution as a spatial distribution of droplet size and speed of the spray can also be measured with a scanning scattered-light measuring system, for example the product SpraySpy made by AOM-Systems GmbH. The test method is set forth in ASTM E1260-03 "Standard Test Method for Determining Liquid Drop Size Characteristics in a Spray Using Optical Nonimaging Light Scattering Instruments".

In an optical patternator, fluorescence is induced in one plane, captured by a camera, and analyzed in an image processing system. A fluorescent component must be added to the spray. An example of an optical patternator with an induced optical fluorescence is the system SetScan made by En'urga Inc. (see U.S. Pat. No. 8,134,703 title "Apparatus for the quality control of nozzles" which is hereby incorporated by reference thereto in its entirety).

Interferometric Particle Imaging (IPI) Systems, for example those made by Dantec Dynamics A/S measure the size and velocity of droplets in the spray.

The droplet size distribution can be determined by means of laser diffraction, for example with the MasterSizer made by Malvern Instruments Ltd. can be measured. The droplet sizes in the spray can also be measured by image analysis of the Mie scattering.

The planar mass distribution in the spray can be contactlessly sensed with an X-ray tomography patternator, for example the SetXvue made by En'urga Inc.

The droplet size distribution is often characterized by greatly simplistic variables such as the Sauter mean diameter $d_{32}$ (representing the average particle size corresponding to the specific surface area of the entire droplet collective) or the average droplet size $d_{50}$. These characteristic values, however, say little about the actual droplet size distribution.

Optical measuring methods are limited in their applicability at high volume flows of the spray and for optically dense liquids such as emulsions.

It is common to all of the above-mentioned methods that the measurements and evaluations are not carried out continuously in real-time under field and application conditions, but usually under stationary laboratory conditions. Usually, only one or a few quality parameters are recorded. Non-intrusive processes are very complex and are only suitable for development and research applications or for the time-controlled examination of cost-intensive industrial processes such as powder coating. The prior art also has deficiencies in applicability in processes for real-time monitoring of the quality of a spray.

SUMMARY

It is an object of the present disclosure to provide a method which overcomes the aforementioned problems. The improved method allows detecting, characterizing and assessing the quality of a spray in real time through the use of radar signatures.

The disclosed method compresses the information on essential quality parameters of a spray in a radar signature of the spray, namely its power density spectrum (PSD).

The disclosed method is based on transmitting a radar signal into a spray and receiving a reflected radar signal by the spray. The frequency of the transmitted signal will be referred to as $f_O$. The frequency of the received signal will be referred to as $f_D$. The transmitted and received signals are mixed by a mixer resulting in a low-frequency Doppler oscillation signal with a beat frequency $f_S=|f_O-f_D|$. The low-frequency Doppler oscillation signal is sampled at a predetermined rate by analog-digital conversion and is stored in a data array with the index [0, 1, 2, . . . , N]. The signal is further transformed from the time domain into a frequency domain.

A continuous-wave (CW) radar system for use with the disclosed method includes a transmitter, a receiver, an antenna, and a mixer. The CW radar system transmits a radar signal directed into the spray. Due to the Doppler effect, the received signal $f_D$ which was reflected by the moving object is frequency shifted accordingly $$f_S=|f_O-f_D|$$

The continuous wave radar includes a mixer which mixes the transmitted signal $f_O$ and the received signal $f_D$ and outputs the resulting low-frequency oscillation signal $f_S$. The frequency $f_S=|f_O-f_S|$ of the mixed signal output is proportional to the speed v of the moving reflector or the moving radar in the case of a stationary reflector. The speed of light $c_O$ is constant and the angle $\alpha$ refers to the angle of attack between of the radar system and the measured object. Consequently, $$f_D = 2 \cdot f_O \cdot \frac{v}{c_O} \cdot \cos(\alpha)$$

Further, the amplitude of this mixed signal $f_S$ is proportional to the reflected power according to the so-called radar equation $$\frac{P_e}{P_s} = \frac{g^2 \cdot \lambda^2 \cdot \sigma}{(4\Pi) \cdot D^4}$$

with $P_e$ being the power of the received signal, $P_S$ being the power of the transmitted signal, being the wavelength of the transmitted signal, $\sigma$ being the radar cross-section of the reflecting object (s), D being the distance between the radar sensor and the reflecting object, and g being the antenna gain in case of a common transmit and receive antenna.

In the measurement setup used with the disclosed method, the transmission power $P_S$, the wavelength $\lambda$ of the transmitted signal, the distance D of the radar sensor to the object and the antenna gain g are constant. The power $P_e$ of the received signal and thus the power of the oscillating mixed signal after mixing the transmitted and received signals, i.e. the amplitude of the Doppler signal $f_S$, is therefore proportional to the radar cross section (RCS) $\sigma$ of the spray which varies with the particle size distribution and the volume flow of the spray.

The Doppler oscillation signal $f_S$ is sampled at a predetermined rate by analog-digital conversion and is stored in a data array with the index n=[0, 1, 2, . . . , N]. The Doppler oscillation signal $f_S$ is transformed from the time domain into the frequency domain. The discrete Fourier transform (DFT) corresponding to $$X(k) = \sum_{n=0}^{N-1} x(n)e^{-\left(i\frac{2\pi nk}{N}\right)}$$

is preferably computed for this purpose as a Radix-2-Fourier Transform FFT (Fast Fourier Transform) corresponding to $$X(k) = \sum_{n=0}^{\frac{N}{2}-1} x(2n)e^{-\left(i\frac{2\pi(2n)k}{N}\right)} + \sum_{n=0}^{\frac{N}{2}-1} x(2n+1)e^{-\left(i\frac{2\pi(2n+1)k}{N}\right)}$$

$$X(k) = \sum_{n=0}^{\frac{N}{2}-1} x(2n)e^{-\left(i\frac{2\pi k}{\frac{N}{2}}\right)} + e^{-\left(i\frac{2\pi k}{N}\right)}\sum_{n=0}^{\frac{N}{2}-1} x(2n+1)e^{-\left(i\frac{2\pi k}{\frac{N}{2}}\right)}$$

$$X(k) = DFT_{\frac{N}{2}}[[x(0), x(2), \ldots, x(N-2)]] + W_N^k DFT_{\frac{N}{2}}[[x(1), x(3), \ldots, x(N-1)]]$$

by dividing the DFT into two parts with even n=[0, 2, 4, . . . , N−2] and odd n=[1, 3, 5, . . . , N−1] indices. $W_N^k$ is the so-called twiddle factor.

The data of the discrete frequency intervals of the FFT with the indices i=[0, 1, 2, . . . , n] correspond to the respectively cumulative signal strength in certain frequency intervals. The frequency intervals of the Doppler radar signal correspond to certain velocity intervals of the reflection objects.

This power density spectrum X(k) of the Doppler radar signal represents integrally information of both the occurring velocities of the droplets as well as the reflection signal amplitude assigned to the velocity and thus a quantity reference to a radar signature characterizing the quality of the spray. The power density spectrum of the Doppler radar signal represents the essential quality parameters of the spray, namely the size distribution of the droplets, the associated speed and hence the impinging force, as well as the volume flow integrally as a radar signature of the spray.

A CW Doppler radar with a wide aperture angle in azimuth and elevation of the antenna diagram of the transmitting and receiving antenna is preferably used for integrative scanning of the complete or a wide range of the spray. This does not provide spatial resolution of the quality parameters of the spray, but rather integrates an overall detection or a detection over a wide area of the spray. A higher spatial resolution and spatial allocation of the quality parameters of the spray can be achieved by use of a scanning radar systems with modulation methods such as FSK (Frequency Shift Keying) or FMCW (Frequency Modulated Continuous Wave) with focusing antenna. Also, several focusing radar systems which detect a spray or a Multi-antenna systems MIMO (multiple in, multiple out) can be used.

As an alternative to the FFT, other methods such as wavelet transformation or a filter bank may be used for the transformation of the Doppler beat signal $f_S$ into the frequency domain.

A process monitoring system for a single nozzle or for an individual nozzle within a complex spray system having a plurality of nozzles of the same type, as for example used in a plant protection device, may utilize "scoring". Scoring refers to a comparative classification or evaluation of the present radar signature of the spray. The comparative classification describes the similarity or dissimilarity of the present radar signature to a pattern or set point radar signature, i.e. a reference radar signature. The present radar signature of an individual nozzle is compared and assessed, in a superordinate processing system, either 1. for a single nozzle by a reference signature which has been taught in advance in accordance with a supervised machine learning method or 2. in the process for a single nozzle of a spraying system from a plurality of identical nozzles with the reference signature of the averaged present radar signature of all nozzles j=[0, 1, 2, . . . , k] of the spraying system.

For this (2.), the similarity of the two FFT data series, i.e. the FFT bins i=[0, 1, 2, . . . , n] of the present radar signature of the individual nozzle and the FFT bins i=[0, 1, 2, . . . , n] of the reference signature over all nozzles j=[0, 1, 2, . . . , k] of the spraying system is analyzed.

Application-specific, only certain frequency intervals can be filtered, i.e., selected indices of the paired data series of the FFT bins are analyzed, for example, for the elimination of the frequency components due to the driving speed.

For this purpose, the empirical Pearson product-moment correlation coefficient $Kor_e(x,y)$ as a measure of the distance between the two paired data series of the FFT bins and the indices i=[0, 1, 2, . . . , n] of the present radar signature x and the reference radar signature y with expected variance estimators is calculated by:

$$Kor_e(x, y) := \frac{\frac{1}{n-1}\sum_{i=1}^{n}(x_i - \bar{x})(y_i - \bar{y})}{\sqrt{\frac{1}{n-1}\sum_{i=1}^{n}(x_i - \bar{x})^2} \cdot \sqrt{\frac{1}{n-1}\sum_{i=1}^{n}(y_i - \bar{y})^2}}$$

In this formula $$\bar{x} = \frac{1}{n}\sum_{i=1}^{n} x_i$$

is the empirical mean value of the data series of the FFT bins i=[0, 1, 2, . . . , n] of the present radar signature of the spray of the individual nozzle.

$$\bar{y} = \frac{1}{n \cdot k}\sum_{j=1}^{k}\sum_{i=1}^{n} y_{ij}$$

is the empirical mean value of all data series of the FFT bins i=[0, 1, 2, . . . , n] of all nozzles j=[0, 1, 2, . . . , k] of the spraying system. And $$y_i = \frac{1}{k}\sum_{j=1}^{k} y_{ij}$$

is the value of the respective FFT-bin of the nozzle averaged over all nozzles j=[0, 1, 2, . . . , k] of the spraying system, i.e. $y_i$ is the respective FFT-bin value i=[0, 1, 2, . . . , n] of the reference signature.

The "scoring" of the current radar signature is, in addition to the above-mentioned Pearson correlation coefficient, possible using further methods of pattern and similarity analysis, for example by using the Frechet distance.

The derivation of the reference pattern from the radar signatures of all nozzles of a spraying system is particularly advantageous because no extensive multivariate data must be collected for the determination of reference signature as a function of nozzle shapes, pressures, speed, etc. Also, no a priori information about the application needs to be available. Changes in the application such as nozzle type, variable volumetric flow, distance between nozzle and surface to be sprayed, and speed with a moving spray system can be immediately reflected.

BRIEF DESCRIPTION OF THE DRAWINGS

Further objects, features, advantages and possible applications of the disclosed method as well as a device for monitoring the working quality of spray systems can be gathered from the following description of several exemplary embodiments with reference to the drawings.

DETAILED DESCRIPTION

Figure 1:
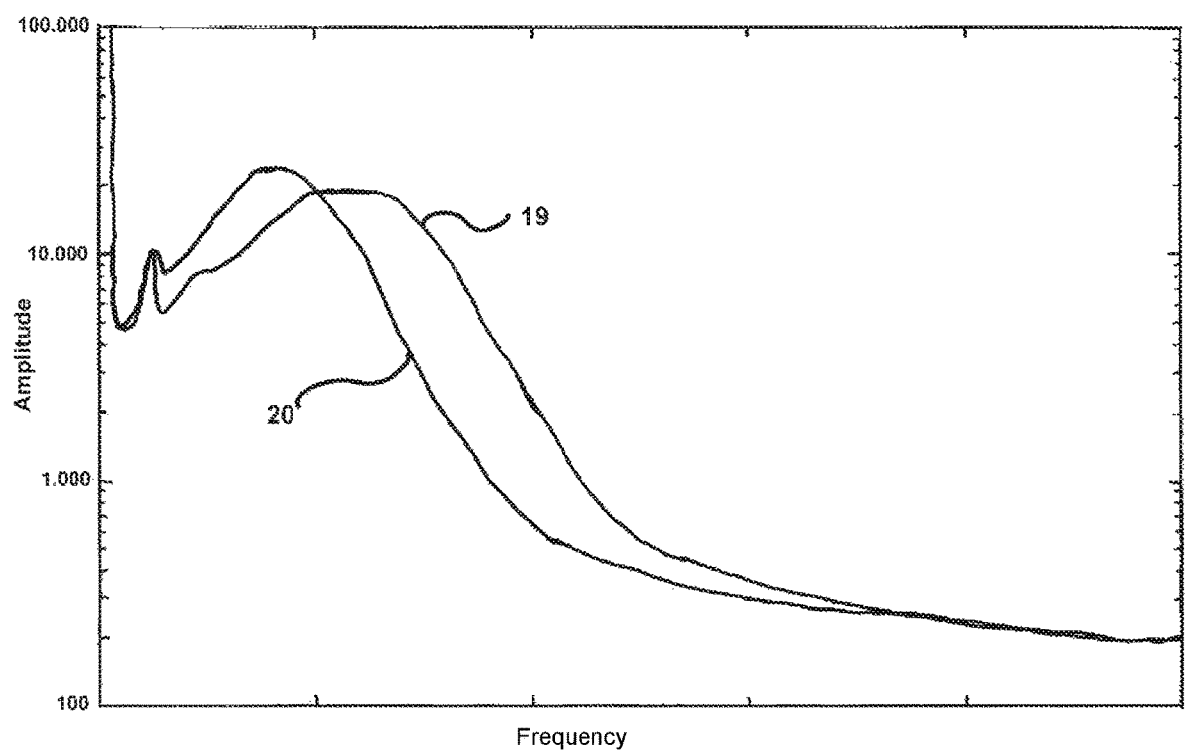
FIG. 1 shows exemplary radar signatures from a flat-jet injector nozzle with a metering aperture Teejet AIXR 110025 VP at low and at high pressure of the liquid.

Referring to FIG. 1, two exemplary radar signatures of the same flat jet injector nozzle Teejet AIXR 110025 VP are shown. A first line 19 shows the radar signature of the spray at low pressure and a second line 20 shows the radar signature of the spray at high pressure of the liquid. The representation of the signal amplitudes of the FFT bins is log-scaled. The differences in radar signals with respect to frequencies and signal amplitudes over the frequency are clearly evident and can therefore be used in the disclosed method to determine the quality of the present spray.

Figure 2:
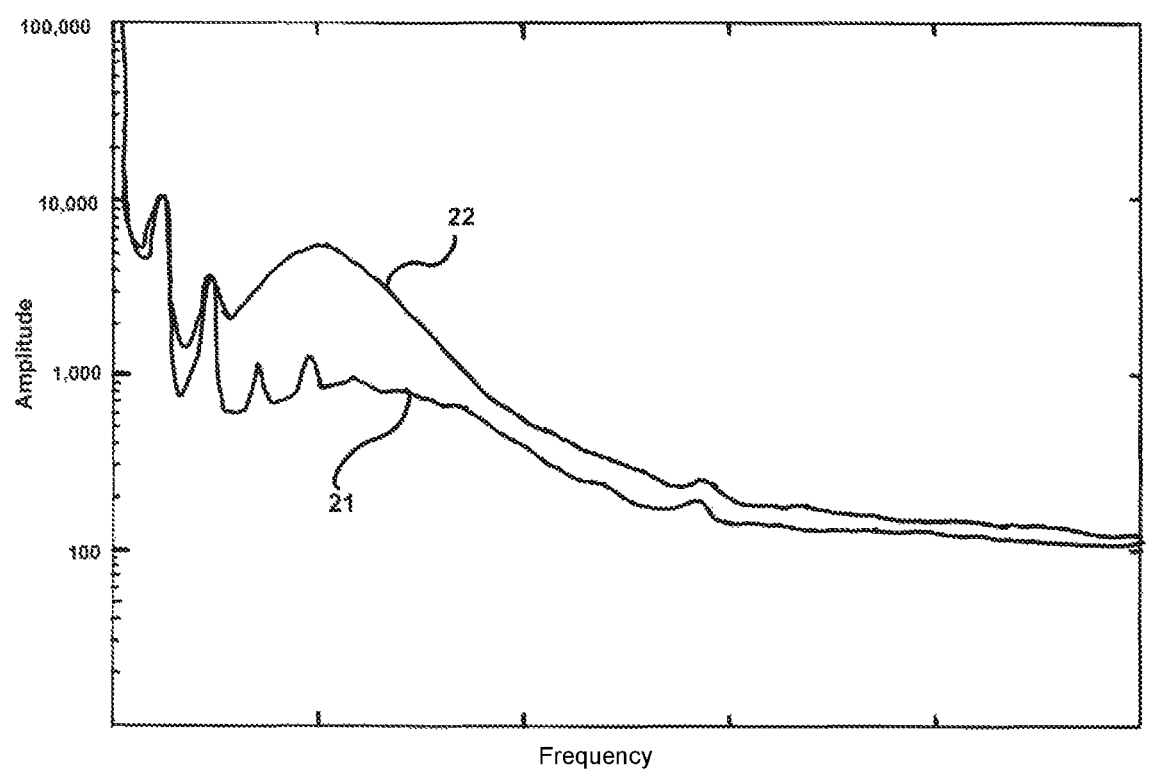
FIG. 2 shows the radar signature of a flat jet nozzle Teejet 8001E-SS in normal operation without blockage and in the case of partial blockade by a needle tip inserted centrally in the nozzle mouth.

Referring to FIG. 2, two exemplary radar signatures of a flat jet nozzle Teejet 8001E-SS are shown. The graph shows normal operation without blockage 22 and a simulated case of partial blockade 21 which has been generated by inserting a needle tip centrally in the nozzle mouthpiece. The representation of the signal amplitudes of the FFT bins is log-scaled. The differences in radar signals with respect to frequencies and signal amplitudes over frequency are also clear and can thus also be used to in the disclosed method to determine the quality of the present spray.

Figure 3:
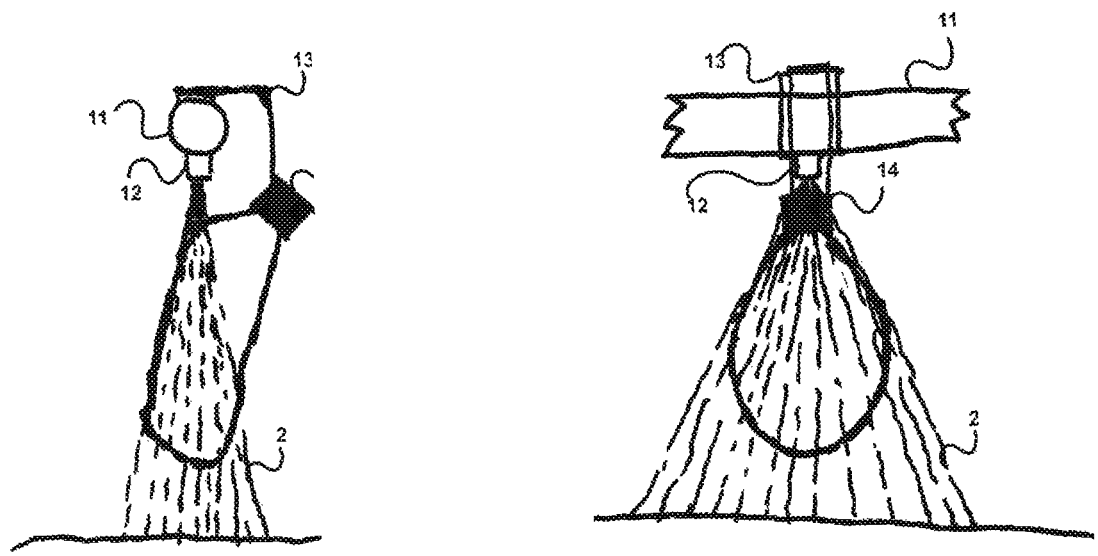
FIG. 3 is a side view and a rear view showing a single nozzle with spray, a radar system and its detection area.
Figure 4:
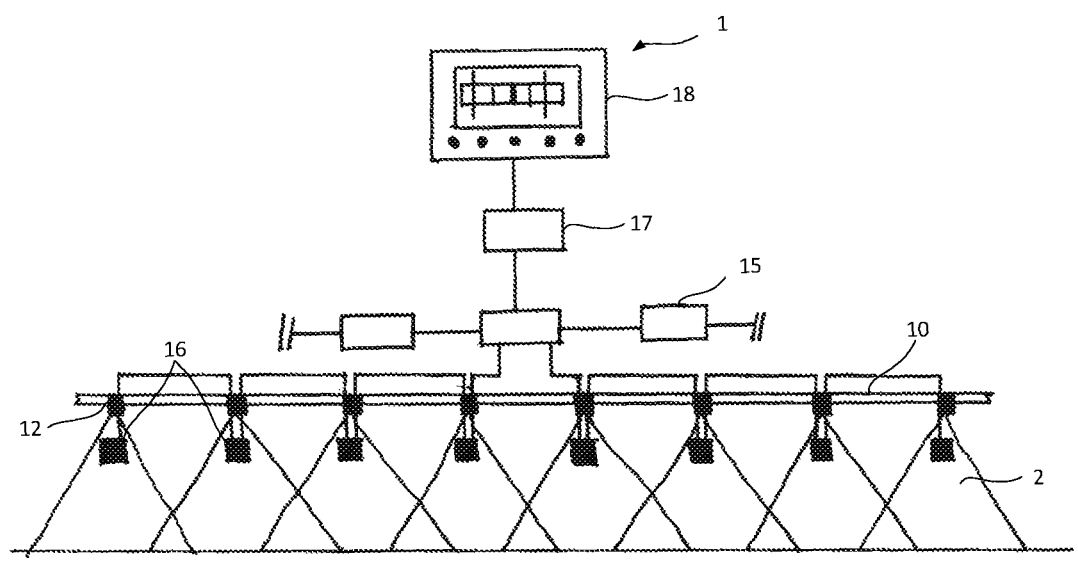
FIG. 4 shows a plant protection device spraying system with a linkage and a liquid-conducting tubes with nozzles.

FIG. 3 and FIG. 4 shows a spray system 1, in this case an exemplary plant protection device, which comprises a linkage 10 with a liquid-conducting tube 11 with nozzles 12. A radar sensor 14 associated with the nozzle 12 is attached to the linkage 10 or the tube 11 by a bracket 13 in such a way that the radar detects a wide range of the respective spray 2.

The spraying system 1 preferably operates in a time-slot method to avoid interferences of the radars and to reduce the overall current consumption of the system. The spray system 1 is designed for monitoring preferably up to 256 nozzles. A plurality of, for example, eight radar sensors 16 are connected to a distributor 15. In the distributor 15, substantial portions of the processing take place, such as the calculation of the FFTs.

By a serial bus system, a plurality of distributors 15 are connected to one another and to an ECU (electronic control unit) 17 processing and control unit. The enumeration of the radar sensors 16 takes place during system initialization by the ECU 17.

A main unit 18 is connected to the ECU 17 as a superordinated system with monitoring software and user interface via a serial bus system. The system comprising of ECU 17, distributors 15 and radar sensors 16 is thereby adaptable flexibly and can be connected to OEM systems. The monitoring software in the main unit analyzes the similarity of the detected radar signatures and the reference radar signature and warns of deviations which go beyond a user-adjustable signal threshold. The corresponding nozzle number (s) is/are displayed and optically signaled at the concerned distributor.

LIST OF REFERENCE NUMERALS 1 spraying system
2 spray
10 linkages
11 piping
12 nozzles
13 brackets
14 radar sensor
15 distributors
16 radar sensors
17 ECU
18 main unit
19 low pressure radar signature
20 high pressure radar signature
21 blocked, partial blockade radar signature
22 radar signature without blockage

What is claimed is:

1. A method for detecting, characterizing and assessing the quality of a spray of atomized liquid, comprising:
    transmitting a continuous wave radar signal with a frequency $f_O$ into the spray;
    receiving a radar signal reflected off the spray, the received radar signal having a frequency $f_D$;
    generating a low frequency Doppler signal with a frequency $f_S=|f_O-f_D|$ by mixing the transmitted radar signal and the received radar signal;
    sampling the low frequency Doppler signal with an analog to digital converter having a predetermined sample rate;
    storing the sampled data in a data array with an index n=[0, 1, 2, . . . , N];
    transforming the sampled data from the time domain to the frequency domain; and
    analyzing the transformed data to derive the quality of the spray,
    wherein the spray is generated by a plurality of nozzles,
    wherein transforming the sampled data from the time domain to the frequency comprises calculating a radar signature, and
    wherein the radar signature of an individual nozzle is compared and assessed, in a superordinate processing system, with a reference signature.

2. The method as in claim 1, wherein transforming the sampled data comprises a discrete Fourier transform DFT with splitting the data array into even indices n=[0, 2, 4, . . . , N−2] and odd indices n=[1, 3, 5, . . . , N−1].

3. The method as in claim 2, wherein the discrete Fourier transform DFT $$X(k) = \sum_{n=0}^{N-1} x(n)e^{-\left(i\frac{2\pi nk}{N}\right)}$$

is calculated as a Radix 2 Fourier Transform FFT (Fast Fourier Transform) with $$X(k) = \sum_{n=0}^{\frac{N}{2}-1} x(2n)e^{-\left(i\frac{2\pi(2n)k}{N}\right)} + \sum_{n=0}^{\frac{N}{2}-1} x(2n+1)e^{-\left(i\frac{2\pi(2n+1)k}{N}\right)},$$

$$X(k) = \sum_{n=0}^{\frac{N}{2}-1} x(2n)e^{-\left(i\frac{2\pi nk}{\frac{N}{2}}\right)} + e^{-\left(i\frac{2\pi k}{N}\right)}\sum_{n=0}^{\frac{N}{2}-1} x(2n+1)e^{-\left(i\frac{2\pi nk}{\frac{N}{2}}\right)}, \text{ and}$$

$$X(k) = DFT_{\frac{N}{2}}[[x(0), x(2), \ldots, x(N-2)]] + W_N^k DFT_{\frac{N}{2}}[[x(1), x(3), \ldots, x(N-1)]].$$

4. The method as in claim 1, wherein transforming the sampled data from the time domain to the frequency domain comprises a wavelet transformation or a filterbank.

5. The method as in claim 1, wherein the continuous wave radar signal is generated by a radar sensor having an antenna with a wide aperture angle in azimuth and elevation so that the transmitted radar signal penetrates at least 50% the spray of an associated nozzle.

6. The method as in claim 1,
wherein the reference signature has been taught in advance in accordance with a supervised machine learning method.

7. The method as in claim 1,
wherein the reference signature is an averaged signature of the plurality of nozzles.

8. The method as in claim 7, wherein a similarity of a first FFT data series i=[0, 1, 2, . . . , n] of the radar signature of the individual nozzle is compared with a second FFT data series of an averaged radar signature over all nozzles j=[0, 1, 2, . . . , k] of a spray system.

9. The method as in claim 1, wherein the sampled data in the frequency domain is compared with a set of reference data and wherein a Pearson correlation coefficient between the sampled data in the frequency domain and the reference data is calculated.

10. The method as in claim 9,
wherein FFT bins are used in transforming the sampled data in the frequency domain and
wherein the calculation of the Pearson correlation coefficient is performed with $$Kor_e(x, y) := \frac{\frac{1}{n-1}\sum_{i=1}^{n}(x_i - \bar{x})(y_i - \bar{y})}{\sqrt{\frac{1}{n-1}\sum_{i=1}^{n}(x_i - \bar{x})^2} \cdot \sqrt{\frac{1}{n-1}\sum_{i=1}^{n}(y_i - \bar{y})^2}},$$

wherein $$\bar{x} = \frac{1}{n}\sum_{i=1}^{n} x_i$$

is the empirical mean value of a data series of the FFT bins i=[0, 1, 2, . . . , n] of a present radar signature of the spray of an individual nozzle,
wherein $$\bar{y} = \frac{1}{n \cdot k}\sum_{j=1}^{k}\sum_{i=1}^{n} y_{ij}$$

is an empirical mean value of all data series of FFT bins i=[0, 1, 2, . . . , n] of all nozzles j=[0, 1, 2, . . . , k] of a spraying system having a plurality of nozzles, and
wherein $y_i$ is the respective FFT-bin value i=[0, 1, 2, . . . , n] of a reference signature.

11. The method as in claim 1, wherein the transmitted continuous wave radar signal is modulated using FSK (Frequency Shift Keying) or FMCW (Frequency Modulated Continuous Wave) modulation to provide a spatial resolution and spatial allocation of a size distribution and associated speeds of droplets within the spray.

12. The method as in claim 1, wherein the transmitted continuous wave radar signal is provided by more than one focusing radar systems or by a multi-antenna MIMO (multiple in, multiple out) system to provide a spatial resolution and spatial allocation of a size distribution and associated speeds of droplets within the spray.

* * * * *